United States Patent [19]

Gubitose

[11] Patent Number: 4,777,851
[45] Date of Patent: Oct. 18, 1988

[54] AUTOMATIC FASTENER ATTACHMENT SYSTEM

[75] Inventor: Nicholas F. Gubitose, Scranton, Pa.

[73] Assignee: RCA Licensing Corporation, Princeton, N.J.

[21] Appl. No.: 914,625

[22] Filed: Oct. 2, 1986

[51] Int. Cl.⁴ .............. F16B 12/00; F16B 12/44; B25B 23/08; B23P 19/06
[52] U.S. Cl. .................... 81/57.37; 81/57.4; 403/13; 403/14; 29/271; 29/281.5; 29/468; 29/525.1
[58] Field of Search ............ 81/57.37, 57.4, 180.1, 81/430; 29/240, 240.5, 271, 281.4, 281.5, 464, 468, 526 R, 787, 798; 403/13, 14

[56] References Cited

U.S. PATENT DOCUMENTS

| | | | |
|---|---|---|---|
| 3,203,082 | 8/1965 | Robbins | 403/14 |
| 3,930,808 | 1/1976 | Miller et al. | 29/200 P |
| 4,225,191 | 9/1980 | Knoski | 403/13 |
| 4,562,756 | 1/1986 | Otsuki et al. | 81/57.4 |

FOREIGN PATENT DOCUMENTS

| | | | |
|---|---|---|---|
| 2715301 | 10/1978 | Fed. Rep. of Germany | 403/14 |
| 0115436 | 10/1978 | Japan | 403/13 |
| 0118313 | 7/1984 | Japan | 81/57.37 |
| 1427010 | 3/1976 | United Kingdom | 403/14 |

Primary Examiner—Frederick R. Schmidt
Assistant Examiner—William E. Terrell
Attorney, Agent, or Firm—Joseph S. Tropoli; Paul J. Rasmussen; Eric P. Herrmann

[57] ABSTRACT

A three-stage system movable in three orthogonal directions includes a pair of cam rods and a screw insertion device secured to one of the stages for displacement in three orthogonal directions. A cabinet has a screw receiving aperture pedestal with aperture locating cam surfaces in a given orientation and spacing. The cam rods are in the same orientation and spacing as the cam surfaces and when engaged align the screw insertion device with the screw aperture. After alignment, a screwdriver attached to the three-stage system drives the screw into the aperture. An automatic feed system feeds screws to the insertion device. A plurality of such three-stage systems are used for automatically attaching an apparatus to the cabinet.

3 Claims, 3 Drawing Sheets

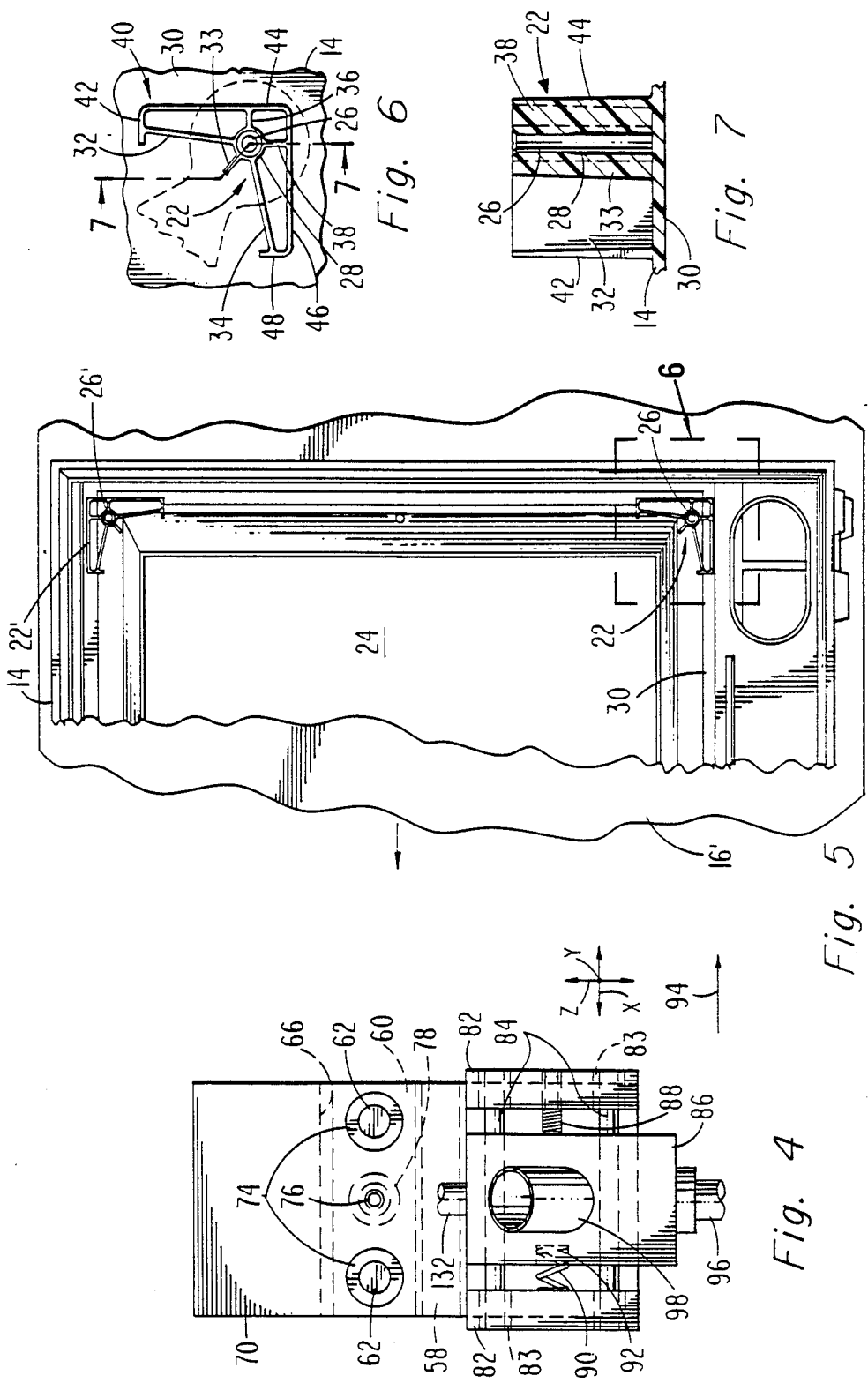

AUTOMATIC FASTENER ATTACHMENT SYSTEM

This invention relates to a system for automatically securing a fastener to a workpiece, and, more particularly, to an automatic screwdriver system.

In a factory environment, it is highly desirable to automate assembly operations wherever possible in the interest of reducing product cost. One such assembly operation is the attachment of fasteners, such as screws and so forth. The problem with attaching fasteners and screws is that they need to be aligned with mating workpiece apertures. Many workpieces are fabricated of molded thermoplastic material, for example, television receiver cabinets. Such cabinets tend to be several feet in length, and relatively flexible. Molding introduces dimensional instability, e.g., distortion, in the workpiece due to thermal factors, e.g., shrinkage and other physical phenomena which tend to change the workpiece's dimensions. Normally factory assembly systems tend to locate workpieces by means of convenient workpiece reference surfaces, such as an edge or the like. Such assembly locating systems may accurately locate portions of a molded workpiece to a reference location, however, dimensional instability within the workpiece, including screw receiving apertures, tends to mislocate such apertures with respect to the usual potential reference surfaces on that workpiece.

By way of example, in U.S. Pat. No. 3,930,808, a workpiece is located to the disclosed screwdriver system by way of the workpiece edge. This arrangement assumes that the screw receiving apertures are located in that workpiece within a given tolerance to that edge. However, in thermoplastic molded workpieces such as television receiver cabinets, such an assumption cannot be made.

The problem becomes further complicated when the workpieces are conveyed on a conveyor system which introduces its own set of dimensional variations. A need is seen, therefore, for a system for attaching a fastener to a workpiece having a fastener receiving aperture, wherein the aperture may have a dimensional instability relative to the usual workpiece locating surfaces so as to present a locating problem for an automatic fastener attaching system.

A system for attaching a fastener to a body according to the present invention includes providing the body with cam means and fastener receiving means having a given orientation and alignment relative to the cam means. A fastener receiving and retaining device is movably secured to a support for displacement in first and second orthogonal directions. The device releasably secures a fastener on a fastener insertion axis which is normal to the first and second directions. Fastener insertion means are coupled to the retaining device for engaging and attaching a retained fastener to the fastener receiving means along the insertion axis in a third direction. Cam follower means are coupled to the retaining device in the given orientation and alignment and are adapted to mate with and engage the cam means for displacing and aligning the insertion axis with the fastener receiving means in the first and second directions. Cam operating means engage the cam follower means with the cam means to thereby align the axis with the fastener receiving means. The cam follower means thus aligns the fastener receiving and retaining device to the fastener receiving means via the cam means on the body.

In the drawing:

FIG. 4 is a front elevation view of a portion of the system of FIG. 2 taken along lines 4—4;

FIG. 5 is a plan view of a body, for example, a television receiver cabinet, to which screws are to be attached by the system of FIG. 1;

FIG. 6 is a plan view of an aperture in the cabinet of FIG. 5; and

FIG. 7 is a sectional elevation view of the aperture of FIG. 6 taken along lines 7—7.

Figure 1:
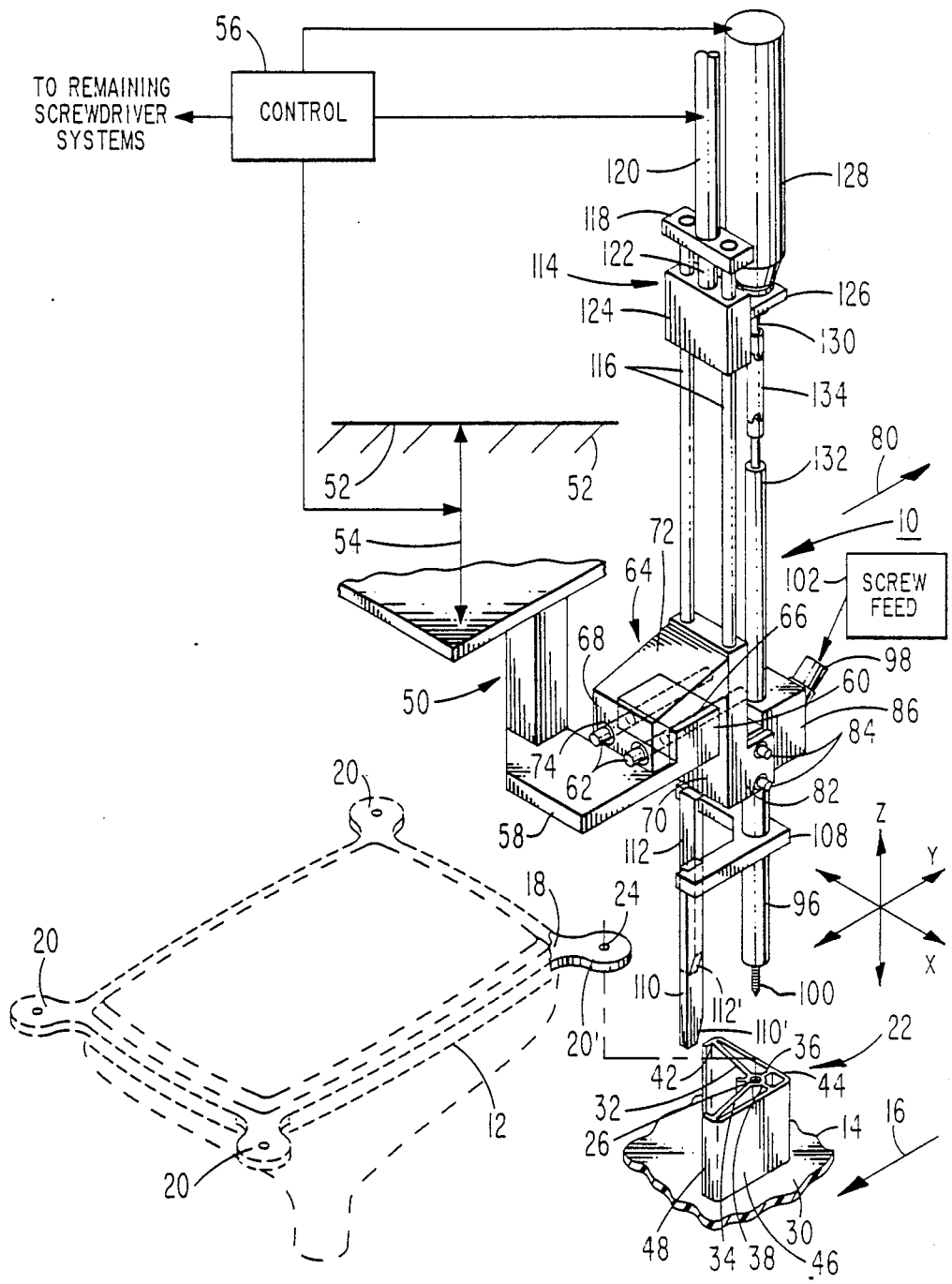
FIG. 1 is an isometric view, partially diagrammatic, of a fastener attaching system, for example, a screwdriver system, in accordance with one embodiment of the present invention.

In FIG. 1, screwdriver system 10 comprises one of an array of four similar systems coupled to a common operating system (not shown) for attaching a television picture tube 12, shown in phantom, to a television receiver cabinet 14. Only so much of the cabinet 14 and the picture tube 12 as needed are illustrated in FIG. 1 for understanding the present invention. A larger portion of the cabinet 14 is shown in more detail in FIG. 5. The cabinet 14, FIG. 1, is conveyed into general alignment with system 10 by a conveyor represented by arrow 16. The conveyor comprises a conveyor belt or carriage which locates the cabinet 14 at the screwdriver system 10 workstation. A conveyor locating system (not shown) locates the cabinet at a reference location relative to system 10.

The picture tube 12 is secured to the cabinet 14 by way of a frame 18 having an array of apertured ears 20 and 20'. Ear 20', shown in solid, is to be attached to aperture pedestal 22 by system 10. Ear 20' has a screw receiving hole 24 which is aligned over aperture 26 of pedestal 22 by another conveying system (not shown). Each of the remaining ears 20 are aligned over a corresponding aperture 26 of a different aperture pedestal of cabinet 14 (the remaining aperture pedestals not being shown). The ears 20 and 20' rest on the corresponding aperture pedestals and are held in place by vacuum cups to maintain alignment as they are indexed to the station where frame 18 is attached to the cabinet 14.

In FIG. 5, cabinet 14 has an array of four aperture pedestals 22 and 22' (only two being shown). The remaining two pedestals (not shown) are spaced diametrically opposite the pedestals 22 and 22' at approximately four corners of the cabinet 14. Cabinet 14 frames an opening 24 in which the television picture tube is to be received. The cabinet 14 is molded of thermoplastic material and, as a result, warpage, due to shrinking and possibly other dimensional instability, is introduced causing the pedestals 22, 22' and the others (not shown) to vary in distance from one another from cabinet to cabinet in unknown amounts. The dimensional variation of the pedestals and their apertures 26, 26' and so forth, is such that an automatic screw driving fixture at a fixed location corresponding to each aperture 26, 26' and so forth, could be misaligned to an extent that the screws would not be inserted properly. System 10, FIG. 1, accommodates this dimensional instability of the screw receiving apertures to automatically insert a screw into its corresponding aperture.

In FIGS. 6 and 7, representative aperture pedestal 22 comprises a circular cylindrical post 28 upstanding from the cabinet 14 frame 30. Radiating radially outwardly from post 28 are a plurality of angularly spaced ribs 32, 33, 34, 36, and 38 which upstand from cabinet frame 30. Upstanding from and normal to the cabinet frame 30 and secured to the outer extended edges of each of the ribs 32, 33, 34, 36, and 37 is a peripheral wall 40 which is a segment of a rectangle. Wall 40 comprises a section 42 secured to the outer edge of rib 32 and is joined perpendicular to a wall section 44 which is secured to the extended edge of rib 36. Secured at right angles to wall section 44 is wall section 46 which is secured to the extended edge of rib 38. Depending from the extended edge of wall 46 is wall section 48 which is secured to the extended edge of rib 34. Sections 42 and 48 are planar and are orthogonal.

Wall sections 42 and 48 serve an important function in the present invention. These sections serve as cam surfaces for locating system 10, FIG. 1, relative to aperture 26. That is, sections 42 and 48 have a given orientation (they are orthogonal relative to each other) and have a given alignment (a given spacing) relative to aperture 26 in a plane normal to the longitudinal axis of aperture 26. That plane is parallel to the plane of the drawing figure. Each rib 32 and 34 coupling the respective wall sections 42 and 48 to the aperture post 28 precludes bending or displacement of sections 42 and 48, respectively, relative to the aperture 26 longitudinal axis. The ribs 32 and 34 thus serve the important function of stabilizing and securing the respective wall sections 42 and 48 in that given relative alignment with respect to aperture 26. The spacings of wall sections 42 and 48 from the corresponding aperture 26 are relatively small as compared to the spacings of the different aperture pedestals from each other. Thus, the wall sections 42 and 48 have relatively stable spacings from the corresponding aperture 26 from cabinet to cabinet.

In FIG. 1, support structure 50 is movably supported for displacement in the vertical z directions relative to a fixed structure represented by symbols 52. The structure 50 displacement system, represented by arrow 54, is operated by control 56. Structure 50 includes an L-shaped support 58 having an upstanding leg 60. Secured to leg 60 are a pair of parallel circular cylindrical guide rods 62. Rods 62 are secured in horizontal spaced fixed relation to leg 60. Rods 62 each have a longitudinal axis parallel to horizontal y directions in which the conveyor system 16 moves.

A support assembly 64 has an inverted U-shaped channel 66 which embraces leg 60. Channel 66 is defined by a vertical leg 68 and a vertical plate 70. Plate 70 and leg 68 are secured to a somewhat V-shaped horizontal member 72 which defines the base region of the channel 66. Rods 62 are slidably secured to leg 68 and plate 70 by horizontally aligned roller bearing bushings 74.

In FIG. 4, a set screw 76 is threaded to plate 70 in a direction parallel to the longitudinal axes of rods 62. The screw 76 abuts support 58 leg 60 facing plate 70. On a diametric opposite side of leg 60 is a compression spring 78 compressed between leg 60 and leg 68 of support assembly 64 (FIG. 1). Compression spring 78 is located in a circular recess in leg 60 facing leg 68. Adjustment of the set screw 76 sets the rest position of leg 60 within the channel 66. The compression spring 78, FIG. 2, forces the leg 60 against the set screw 76 in y direction 80. The support structure 50 thus forms a first stage which is displaceable in the vertical z directions and the support assembly 64 forms a second stage which is displaceable relative to structure 50 in the y directions normal to the z directions.

Figure 2:
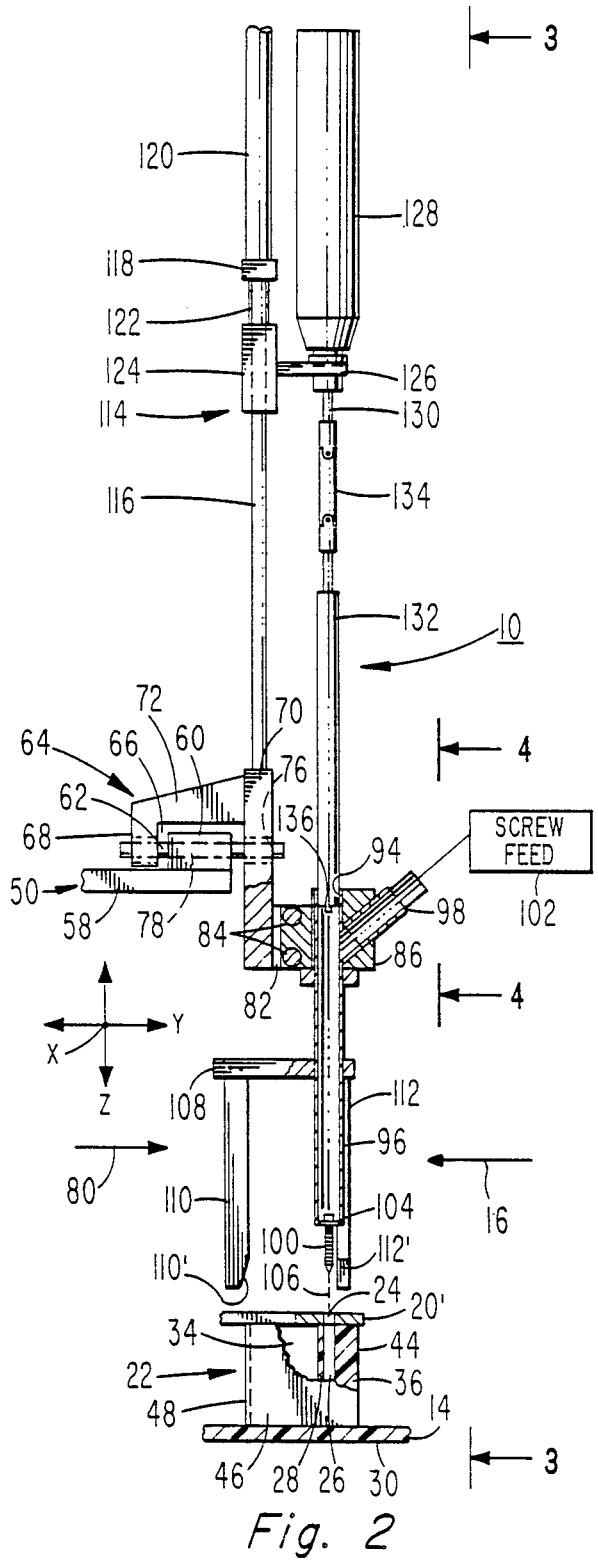
FIG. 2 is a side elevation view, partially in section, of a portion of the system of FIG. 1.
Figure 3:
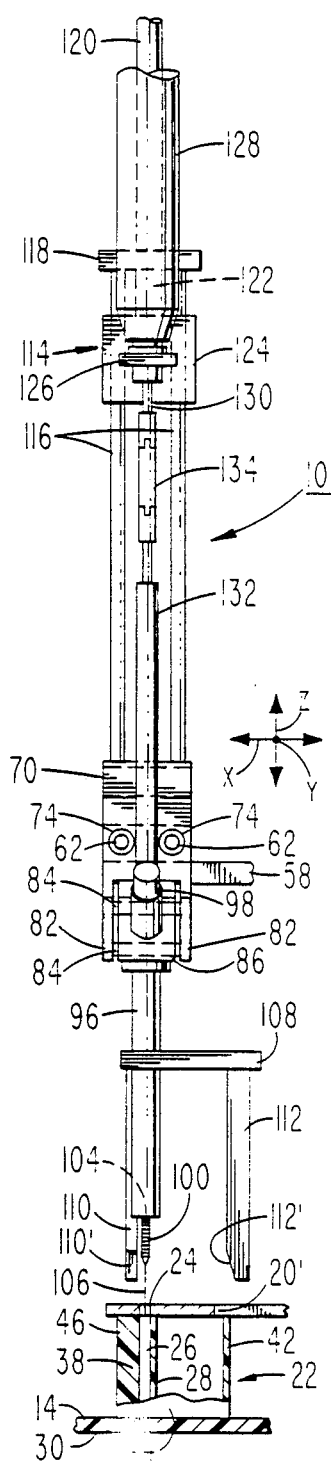
FIG. 3 is a front elevation view of the embodiment of FIG. 2 taken along lines 3—3.

In FIGS. 2 and 3, cantilevered from plate 70 in horizontal y directions are a pair of spaced parallel plates 82. A pair of circular cylindrical guide rods 84 are slidably secured to plates 82 by roller bearing bushings 83 (FIG. 4) similar in construction to roller bushings 74. Guide rods 84 are parallel to the horizontal x directions normal to the y directions. A transition member 86 is fixed to the rods 84 in the space defined by the facing surfaces of plates 82.

In FIG. 4, a set screw 88 is threaded to one of plates 82. A compression spring 90 is secured in a recess 92 in member 86 and abuts the other of plates 82. Spring 90 forces member 86 in the x direction 94 against set screw 88. Set screw 88 adjustably sets the rest position of member 86 in the x directions relative to plates 82. Member 86 thus forms a third stage which moves in the x directions orthogonal to the first and second stages represented, respectively, by support structure 50 and support assembly 64, FIG. 2.

In FIG. 2, member 86 has a bore 94 in which is secured a vertically oriented tube 96. Screw feed tube 98 is secured to member 86 in communication with the hollow core of tube 96 for feeding screws such as screw 100 into tube 96. Screws are fed into tube 98 by a screw feed 102. Screw feed 102 preferably is a vibratory feed system of the type which is generally well known. The screws are fed selectively one at a time into tube 96. A fed screw falls by gravity into screw retaining jaws 104 at the bottom of tube 96 and are retained in place vertically oriented, as shown. The screw 100 is aligned in tube 96 on vertical axis 106. Jaws 104 at the base of tube 96 pass the threads of the screw therethrough and releasably hold the screw in a vertical orientation. When the screw 100 is threaded to aperture 26 and tube 96 is lifted, jaws 104 release the screw.

A horizontally oriented L-shaped cam support 108 is secured to tube 96. A pair of camming rods 110 and 112 depend from support 108 and extend vertically beneath the extended tip of retained screw 100. The rods 110 and 112 may be identical and may comprise members rectangular in cross-section having tapered cam end surfaces 110' and 112', respectively. The tapered end surfaces 110' and 112' face in orthogonal directions parallel to the y and x directions, respectively.

The spacing of the camming surfaces 110' and 112', their alignment relative to axis 106 and their relative orientation, is substantially the same as the spacing, alignment and relative orientation of wall sections 42 and 48, FIG. 6, to aperture 26. The wall sections 42 and 48 (FIG. 6) face in the same respective x and y directions as the cam surfaces 110' and 112'.

By securing the cam rods 110 and 112 on the third stage support member 86 that member, via its mounting on rods 84 relative to the second stage support assembly 64 and the mounting of the second stage support assembly 64 via rods 62 to the first stage support 58, can resiliently displace in either of the horizontal orthogonal x and y directions. When the cam surface 110' engages pedestal 22 wall section 48, the third stage member 86 may be displaced to the left of the drawing figure via the mounting of support assembly 64 on rods 62. Simultaneous therewith the engagement of the cam surface 112' with the wall surface 42 cams the support member 86 in the x directions into the plane of the drawing. Because the cam rods 110 and 112 are secured to the tube 96 holding the screw 100, the screw 100 is automatically aligned with the aperture 26 in the cabinet frame 30 due to the substantial similarity in spacing of the screw 100 to cam surfaces 110' and 112' as the aperture 26 is to the wall sections 42 and 48, as discussed above. Thus, the engagement of the cam rods 110 and 112 with the wall sections of the frame 30 automatically aligns the screw 100 with its mating aperture as the cam rod assembly is displaced toward the aperture in the z directions.

Since there may be four pedestals 22, 22' and corresponding apertures and wall sections, one at each corner of the cabinet 14, FIG. 1, a separate screwdriver system 10 is supplied for each pedestal. These separate systems 10 are secured to a common support structure represented by symbols 52. Control 56 may operate each of the four screwdriver systems 10 in a given sequence for sequentially securing the ears 20, 20' of the picture tube, FIG. 1, to the cabinet frame 30.

In FIGS. 1, 2, and 3, screw drive subassembly 114 drives the screw 100 into the aperture 26. Screw drive subassembly 114 includes a pair of vertically oriented circular cylindrical rods 116 secured upstanding from plate 70. A bracket 118 is secured in fixed relation to the rods 116 at their upper ends. An actuator 120 is secured to bracket 118 in a vertical orientation. Actuator 120 may be an air cylinder or an electrically activated solenoid. Cylinder 120 has a shaft 122 which selectively extends in the vertical z directions in response to a signal from control 56. The extended end of shaft 122 is secured to guide member 124. Member 124 is slidably secured to rods 116 for displacement in the vertical z directions. Member 124 may include roller bearing bushings coupled to rods 116. A screwdriver support beam 126 is horizontally cantilevered from member 124. A screwdriver motor 128 is secured to beam 126 with the motor shaft 130 vertical. Shaft 130 is coupled to a screwdriver bit drive rod 132 via a universal joint coupling 134. In FIG. 2, a screw drive bit 136 is secured to the lower end of drive rod 132. Rod 132 and bit 136 are slidably secured within the core of tube 96 for displacement in the z directions. Bit 136 is normally just above the inlet aperture of screw feed tube 98 in transition member 86.

In operation of the screw drive subassembly, control 56, FIG. 1, and lowers structure 50 and then successively operates first the air cylinder 120 and then the screw drive motor 128. Lowering of structure 50 engages the cam surfaces 110' and 112' with the respective wall sections 48 and 42 of the cabinet frame 30. At this time, the screw 100 is suspended just above and in axial alignment with the aperture 26. Engagement of the cam surfaces 110' and 112', as discussed above, aligns the screw 100 with the aperture 26 longitudinal axis. This alignment may cause displacement of the cam rods 110 and 112 in the respective y and x directions. Because the screwdriver drive rod 132 and its connected bit are secured to member 86, the bit displaces with member 86 in response to the camming actions of cam rods 110, 112 in the x and y directions. Because te motor 128 is secured to the support assembly 64 via beam 126, the motor 128 and beam 126 do not displace in the x directions. The universal joint coupling 134 permits relative displacement of bit 136 and drive rod 132 to the motor 128 in the x directions.

Control 56 continues to lower structure 50 after engagement of the cam rods with the wall sections of the frame 30 pedestal 22. After alignment of the screw is completed, operation of air cylinder 120 extends its shaft 122 in a direction toward frame 30 lowering beam 126 and motor 128 and drive rod 132 in that direction. This engages bit 136 wth screw 100, FIG. 2. Once the bit is so engaged, control 56, FIG. 1, operates motor 128 to rotate the drive bit and thus screw 100, inserting the screw 100 into aperture 26, while the structure 50 is being lowered. This thus secures ear 20'. After the screw is inserted, the structure 50 and thus system 10 are lifted and a new screw is fed to jaws 104. The jaws may comprise passive resilient cantilevered spring fingers which automatically release the screw as the jaws and system are lifted after the screw is driven into the aperture.

In a similar manner, each of the remaining ears 20 are secured to a corresponding aperture in the frame 30 via systems similar to systems 10 located in alignment with those ears. In one manufacturing implementation it has been determined that the ears are best secured in time sequence rather than simultaneously. Thus, each separate screwdriver drive system 10 aligned with a given ear is operated by a master control such as control 56 in that time sequence.

Thus, regardless the relative spacing errors of the apertures 26 on a given cabinet due to thermal distortions, warpage, and other factors, the screw driving system aligns the given screw and drives that aligned screw into that aperture. While the apparatus of the present invention has been described in connection with screws, it should be understood that the disclosed system is generally applicable to other types of fasteners. For example, one other type of fastener may be a snap device adapted to snap in place and lock to an aperture in a mating assembly. Such snap fasteners require alignment with their mating aperture and are required to be driven in a vertical direction parallel to the z directions in the aperture. Should such a fastener be misaligned, then the system of the present invention would align such a snap action fastener with its mating aperture for vertical insertion into that aperture. In this case, the motor 128 for rotationally driving a screw in the present implementation would not be used.

In the present embodiment the cam rods 110 and 112 are shown fixed to the tube 96. It should also be understood that what is important is that the relative spacing of the cam surfaces 110' and 112' be fixed to the tube 96 in the desired horizontal direotions. For example, the cam rod 110 should be fixed in the y directions in a given spacing relative to tube 96 and the cam rod 112 should have a fixed spacing to tube 96 in the x directions. Since member 86 only moves relative to the support assembly 64 in the x directions, the y spacing being fixed, then in the alternative, cam rod 110 could be fixed to plate 70 or member 72. Also, cam rods 110 and 112 may be secured directly to the support member 86 rather than to tube 96.

The camming surfaces 110' and 112' of the respective camming rods 110 and 112 extend below the screw 100 to engage wall sections 42 and 48 before the screw enters its aperture. This insures that the screw 100 is initially aligned with aperture 126 before insertion. While the wall sections 42 and 48 are upstanding from frame 30, they may be recessed. In the alternative, the camming rods 112 may be formed of circular cylindrical rods with conical tips or the wall sections inclined and the rods rounded at their tips.

As is apparent, the ribs 32 and 34 connected to the respective wall sections 42 and 48 strengthen these wall sections, minimizing displacement of the wall sections in response to their engagement with the cam rods 110 and 112. It is apparent that it is important that the wall sections 42 and 48, when so engaged by the cam rods, remain relatively rigid with respect to their location to aperture 26. Ribs 34 and 32 insure this rigidity during such engagement. Of course, if the wall sections were recessed in a plate member having an aperture such as aperture 26 formed therein then the ribs may not be necessary.

What is claimed is:

1. In a system including an automatic fastening apparatus and a support member including an aperture for receiving a fastener, said support member being attached to a deformable body and configured to engage the automatic fastening apparatus having first and second cam means for accurately aligning, in two dimensions, said apparatus with said aperture, said support member comprising a first element having a tubular cavity for receiving said fastener, said cavity having a longitudinal axis and one end of said cavity forming said aperture;

a first rectangular caming surface spaced apart from said first element, said first caming surface being parallel to said longitudinal axis of said tubular cavity;

a second rectangular caming surface spaced apart from said first element and said first caming surface, said second caming surface being parallel to said longitudinal axis of said tubular cavity and said first and second caming surfaces being nonparallel to each other;

means for maintaining said first caming surface, and second caming surface and said first element in a substantially fixed positional relationship, to permit said first and second caming surfaces to engage said first and second cams and thereby align said fastening apparatus with said aperture.

2. The system set forth in claim 1 wherein said first element includes an upstanding post, said post having said aperture therein, a plurality of upstanding ribs radiating from and secured to the post, and a wall having a surface parallel to said longitudinal axis and secured to the extended edges of said ribs, said wall including said first and second caming surfaces, and disposed to permit registration of a further element with said first element for attachment thereto with said fastener when said cams engage said caming surface 3. The system of claim 2 wherein said wall includes first and second portions extending in normal directions, each said portion being secured to a different one of said ribs.

* * * * *